Aug. 12, 1924.

C. WALDRON 1,504,289

CYCLE SADDLE

Filed March 28, 1922        2 Sheets-Sheet 1

CHARLES WALDRON INVENTOR.

BY Richey, Slough & Hales

HIS ATTORNEYS

Aug. 12, 1924.

C. WALDRON

CYCLE SADDLE

Filed March 28, 1922      2 Sheets-Sheet 2

1,504,289

CHARLES WALDRON *INVENTOR.*

BY *Richey, Slough & Fales*

HIS ATTORNEYS

Patented Aug. 12, 1924.

1,504,289

UNITED STATES PATENT OFFICE.

CHARLES WALDRON, OF ELYRIA, OHIO, ASSIGNOR TO THE TROXEL MANUFACTURING COMPANY, OF ELYRIA, OHIO, A CORPORATION OF OHIO.

CYCLE SADDLE.

Application filed March 28, 1922. Serial No. 547,579.

*To all whom it may concern:*

Be it known that I, CHARLES WALDRON, a citizen of the United States, residing at Elyria, in the county of Lorain and State of Ohio, have invented certain new and useful Improvements in Cycle Saddles, of which the following is a full, clear, concise, and exact description, as will enable others skilled in the art to which my invention appertains to make and use the same.

My invention relates to cycle saddles, and particularly to cycle saddles adaptable for use on bicycles or tricycles, and in which the saddle proper is supported on springs so as to contribute to the comfort of the rider of such cycles.

An object of my present invention is to provide such a cycle saddle as may be inexpensive to manufacture, and which will be, nevertheless, durable and comfortable to the user.

Another object of my invention is to provide such a cycle saddle employing but very few parts, and those parts being capable of being inexpensively fabricated.

Another object of my invention is to provide a cycle saddle which may be easily assembled or dis-assembled but which when assembled will have all of its parts so secured that they will not accidentally be displaced.

Other objects of my invention, and the invention itself will be more apparent by reference to the drawings accompanying this specification, and made a part hereof. Referring now to the drawings—

Figure 1:
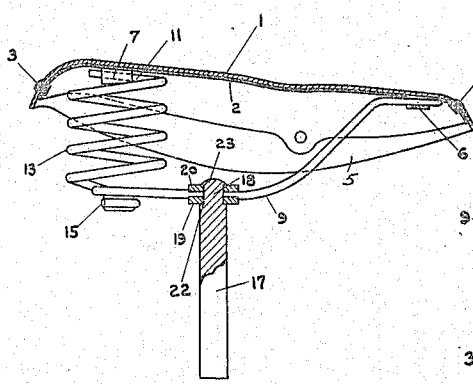
Fig. 1 shows a vertical longitudinal medial section, on the line 1—1 of Fig. 3, of an embodiment of my invention.

Referring now to all of the figures in which like parts are indicated by like reference characters, at 1 I show the saddle seat which may be made of leather or leather substitutes, and at 2 I show a seat frame underlying the saddle seat and secured to it at a number of points adjacent its periphery by rivets 3. I preferably make the seat frame 2 underlie the major portion of the saddle seat cover 1, but allow a certain length of skirt to depend particularly at the side portions 4 and 5 beyond the edge of the frame. The said frame is made of sheet metal, preferably from steel, and has three depressed loop portions, 6, 7, and 8 arranged at the corners of an isosceles triangle, the apex thereof being the depressed portion 6, and the other two corners being located in the rear portion of the saddle.

In referring to the portions 6, 7 and 8 hereinafter, and in the claims as "loops," or "loop members," I do this in a broad sense, comprehending within the term, other forms not specifically shown, and which would not ordinarily be strictly called loops but which would perform the same function in the same way.

The depressed portions above referred to are preferably formed by pressing from the sheet metal frame 2 in downward direction a short length of the material so as to stretch the same, thus forming loops for securing at the forward or pommel end of the saddle, the saddle supporting frame reach members 9 and 10, which at this point form a U-shaped loop and which may be inserted between the main portion of the frame 2 and the depressed portion 6 also, to secure the ends 11 and 12, of the resilient spiral spring members 13 and 14 at the rear portion of the saddle; the reach members 9 and 10 are secured to the pommel end of the saddle frame 2 at 6, and at the rear portion of the saddle they support the saddle through the springs 13 and 14 which are secured to the said reach members at 15 and 16.

Figure 4:
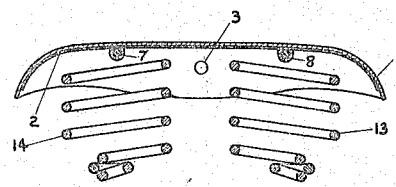
Fig. 4 shows a transverse sectional view on the line 4—4 of Fig. 3.

The springs 13 and 14 are secured to the ends of the reach members 9 and 10 by turning the springs about their vertical axis, at the same time pressing their ends which comprise spirals of reduced diameter see Fig. 4 so that the spirals are intertwined into the convolutions of the saddle supporting frame reach members, said reach members having their ends adapted for screw threaded engagement with the said spring ends by causing the reach member ends to be formed with one or more turns of a general spiral shape; the successive convolutions of the spring members 13 and 14, which are adapted for threaded engagement with the convolutions of the supporting frame member upwardly, are preferably of increased diameters.

The springs 13 and 14 are preferably intertwined into the coiled ends of the reach members prior to the assembly of the reach members and springs to the saddle seat, then the U-shaped end of the reach member is forced between the pommel depressed loops of the saddle seat frame so as to make a tight fit between the said loop and the main body of the frame. The springs 13 and 14 have their upper ends 11 and 12, preferably substantially straight and extending preferably in a direction parallel with the medial longitudinal line on which the sectional view of Fig. 1 is taken, although such a direction may be varied if desired. The flexibility of the spring permits the same to be distorted somewhat so as to permit forcing of the ends 11 and 12 into the loops provided to receive them from the body of the saddle seat frame 2, such loops being, as before described, depressed from and integral with the said frame.

The saddle may now be secured to the cycle upon which it is to be used by clamping, in any suitable way, the reach members 9 and 10 at an intermediate point thereof to the said cycle, and this may be accomplished by providing a cycle saddle supporting post 17 having a reduced end 18 and clamping members 19 and 20, the said clamping members being grooved longitudinally as shown at 21 to receive the said reach members 9 and 10 on either side of the said post, the said clamping members 19 and 20 with the interposed reach members being securely clamped on the shoulder 22 of the post 17 by riveting the head 23 of the post, or in any other suitable well known way, such as, for instance, providing a removable nut for a threaded extension of the post 17 if it is desired to make the post easily removable from the said reach members, although in the most inexpensive structures this may not be a sufficiently valuable feature to compensate for the additional expense required to provide it.

Figure 5:
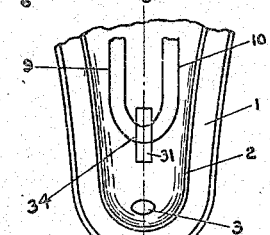
Fig. 5 illustrates a bottom plan view of the forward portion of a saddle structure differing from that of the foregoing figures in the construction of the saddle forward portion.
Figure 6:
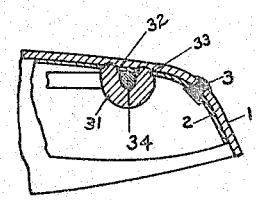
Fig. 6 shows a longitudinal medial section on the line 6—6 of Fig. 5.

In the embodiment of my invention illustrated in Figs. 5 and 6, instead of securing the forward portion of the saddle supporting frame comprising the joined reach members 9 and 10 by means of a strap member 6 made integral with the seat reinforcing frame 2, I herein secure the U-shaped end of such supporting frame by a substantially U-shaped securing member 31, such securing member having ends reduced in cross section and projecting through openings 32 and 33 in the pommel portion of the said seat reinforcing frame, and the ends or heads of such arms being riveted over on the upper surface of such reinforcing frame, prior to the attachment thereto of the seat cover member.

In this way the supporting frame is adapted to permit the rotation of the seat about the looped end 34 of the reach members 9 and 10 joined thereat when the spring members 13 and 14 are compressed or expanded during the use of the saddle on a cycle, or other vehicle where such a saddle may be employed.

In the embodiment illustrated in Figs. 1 to 4 a similar rotative action is had, although there is the additional movement of the forward portion of the seat relative to the forward portion of the saddle support due to a sliding action of the seat and the support in the opening provided by the strap 6, and the body of the seat reinforcing frame 2.

Figure 7:
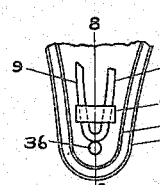
Fig. 7 shows a bottom plan view of a modified form of the embodiment illustrated in Figs. 1 to 4 inclusive, and in which form a depressed portion of the seat reinforcing frame prevents sliding of the forward portion of the seat relative to the supporting means secured to the seat at such forward portion.
Figure 8:
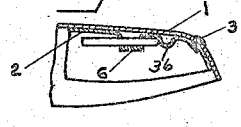
Fig. 8 shows a longitudinal medial sectional view on the line 8—8 of Fig. 7.
Figure 2:
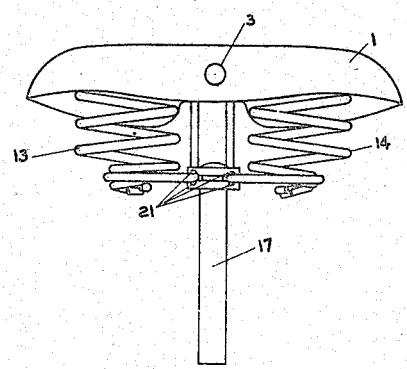
Fig. 2 shows a rear elevational view of the embodiment illustrated in Fig. 1.
Figure 3:
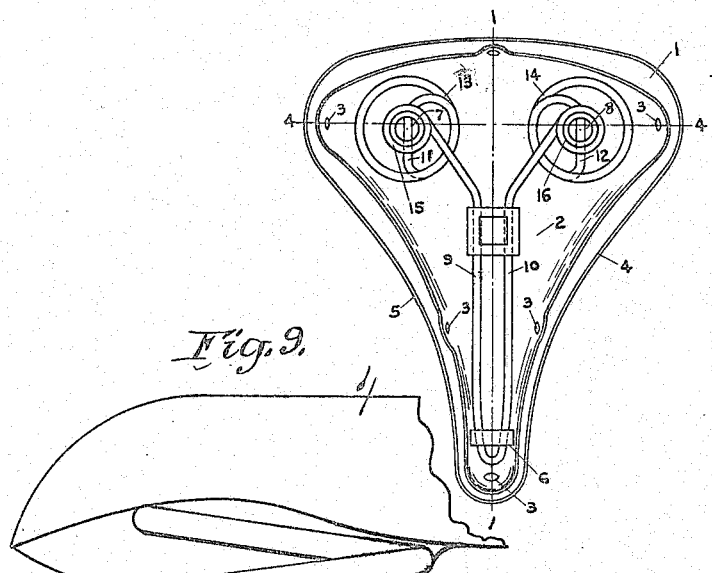
Fig. 3 shows a bottom plan view of the said embodiment.
Figure 9:
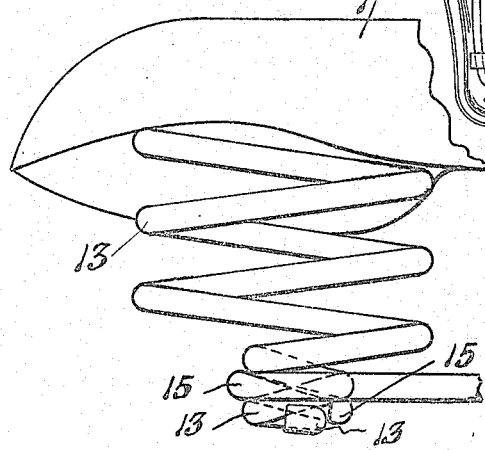
Fig. 9 is an enlarged fragmentary view illustrating one of the coil springs intertwined with the coil supporting frame as illustrated in Fig. 2.

In the modified form of the embodiment of Figs. 1 to 4 inclusive, illustrated in Fig. 7, a depressed portion 36 extending downward from the reinforcing frame 2 at a point in the longitudinal medial line thereof and forward of the strap 6, prevents any sliding action of the joined reach members secured to the reinforcing frame by the said strap, the length of the reach members and the positioning of the said depression being such that there will be a normal compressive action of the reach members between the said depression and holding strap and the springs 13 and 14 at the rear ends of the reach members.

In this form of the invention, the seat will pivot about a point determined by the strap and depression, but there will be no sliding action of the forward portion of the seat relative to the said seat support comprising the said joined reach members.

Having thus described my invention in specific embodiments, I am aware that numerous and extensive departures may be made from the embodiments herein illustrated and described, but without departing from the spirit of my invention.

I claim:—

1. A saddle for cycles comprising a sheet metal seat frame having a cover secured thereon, and a supporting frame comprising longitudinally extending reach members joined at one end and secured to the pommel portion of said seat frame and having their opposite ends coiled, coiled springs secured to and depending from the cantle portion of said seat frame, the lower depending ends of said coiled springs being intertwined with the coiled ends of said reach members, and clamping means for connecting said reach members to a cycle.

2. In a saddle, a seat, a reinforcing sheet metal frame secured to the underside of the said seat, a saddle supporting frame secured at its forward end to the pommel end of the said reinforcing frame, springs connected with the rear portion of the said reinforcing frame near the sides thereof, the supporting frame provided with coils at the rear portion thereof, said springs having their lower ends intertwined with said coils, and clamping means for securing the intermediate portions of the said supporting frame to the frame of a cycle.

3. In a saddle, a seat, a reinforcing sheet metal frame secured to the under side of the seat, a longitudinally extending supporting frame adapted to be secured at its forward end to the forward end of the said reinforcing frame, springs connected with the rear portion of the said supporting frame, said reinforcing frame comprising depending integral loops disposed near the rear and side portions thereof, said springs being adapted to be secured within the said looped members.

4. In a saddle, a seat, a reinforcing frame upon which said seat is secured, said frame having longitudinally extending loops near its rear corners, a supporting frame, said supporting frame being secured to the reinforcing frame near its forward end, a pair of resilient saddle supporting coiled springs supported at their lower ends on the rear end of said supporting frame, and terminating at their upper ends in a longitudinally extending straightened wire portion, said straight wire portion being inserted within said longitudinally extending loops, and means to clamp an intermediate portion of the said supporting frame to a cycle.

5. In a saddle, a seat, a reinforcing sheet metal frame secured to the underside of the said seat, a supporting frame, springs connected with the rear portion of the said reinforcing frame near the sides thereof, the supporting frame provided with coils at the rear portion thereof, said springs having their lower ends intertwined with the said coils, said reinforcing sheet metal frame having a loop portion struck down from the body of the frame so as to provide a longitudinally extending opening to admit the forward end of the said supporting frame to secure the forward end of said frame to said reinforcing frame, and clamping means for securing the intermediate portions of the said supporting frame to the frame of a cycle.

6. In a cycle saddle, a seat frame, loops extending from the under side of said seat frame, a plurality of said loops being at one end of said frame and but one of said loops being at the other end thereof, coiled springs having an end passing through and depending from said loops at the one end of said seat frame, and a supporting frame secured to the loop at the opposite end of said seat frame, said supporting frame being intertwined with the depending ends of said coiled spring at a point removed from its connection with said seat frame.

7. In a cycle saddle, a sheet metal seat frame having open loops projecting from the underside of said seat frame, a supporting frame connected at its front end to one of the loops projecting from said seat frame, and a pair of coiled springs secured to and supported upon the end of said supporting frame opposite its connection with said seat frame, said springs being connected to the remaining loops projecting from said sheet metal seat frame.

8. In a cycle saddle, a seat frame, coiled springs secured directly to and depending from said seat frame, and an integral supporting frame secured at one end to said seat frame and having coils at its opposite end, said coils being intertwined with the depending ends of said coiled springs.

9. In a cycle saddle, a sheet metal seat frame having loops depending therefrom, a pair of coiled springs having one end extending through loops depending from said seat frame, and a supporting member secured at one end in a loop depending from said seat frame and terminating in a pair of coiled ends beneath said springs, said springs being intertwined with the coiled ends of said supporting member to provide a connection therebetween.

10. In a saddle, the combination of a sheet metal frame provided with retaining loops formed near the rear end thereof, a pair of coil supporting springs extending from said frame, said springs having the inner ends thereof extending under the retaining loops of said frame, and a bent reach member secured to the forward end of said frame and having rearwardly extending arms to which the extended ends of said springs are connected.

11. In a saddle, the combination of a frame having a looped retaining member secured near the forward end thereof, a pair of coiled supporting springs secured to and extending from the rear portion of said frame, and a bent reach member extending through the looped member at the front of said frame and having rearwardly extending arms to which extended ends of said springs are connected.

12. In a saddle, the combination of a metal frame having retaining loops formed near the rear thereof, and a looped member secured near the front end thereof, a pair of coiled springs extending from said frame, said springs having the inner end thereof extending under said retaining loops, and a bent reach member extending through the looped member secured near the front of said frame and having arms extending rearwardly under and connected to the depending ends of said springs.

13. In a cycle saddle, a seat element, a saddle post, a spring supporting element connected to said seat and said post, and cooperative connecting means forming the only connection between said supporting element and said seat element comprising projections of the one element insertable within projection receiving portions of the other element, a portion of said connecting means being resiliently distorted by the act of being connected to the other portion, and the connection being maintained by the distorted portion of said means in attempting to regain its normal unstressed form.

14. In a cycle saddle, a seat element, a saddle post, a spring supporting element connected to said seat and said post, and cooperative connecting means forming the only connection between said supporting element and said seat element comprising projections of the one element insertable within projection receiving portions of the other element, a portion of said connecting means being resiliently distorted by the act of being connected to the other portion and the connection being maintained by the distorted portion of said means in attempting to regain its normal unstressed form, said spring supporting element comprising a longitudinally extending main portion connected to the seat forward portion, and portions disposed near and below the rear corner portions of the seat, and also a pair of spiral spring portions, said spring portions projecting upwardly from said rear main portions, and uniting the same to the rear portions of the seat above the same, the connections between the said spring portions and the main portions of the supporting element being made by inserting a projection of the one into a projection receiving portion of the other, and the connection so formed being maintained by the deforming of a resilient part of the united parts, and the resulting attempt of the deformed part to regain its normal unstressed form.

15. In a cycle saddle, a seat element, a saddle post, a spring supporting element connected to said seat and said post, and cooperative connecting means forming the only connection between said supporting element and said seat element comprising projections of the one element spring pressed into connection with the other element, the connection being securely and solely made and maintained by the re-acting spring pressure set up in the connecting means by the mere act of making the connection.

In witness whereof, I have hereunto signed my name this 21st day of March, 1922.

CHAS. WALDRON.